United States Patent [19]

Gorges

[11] Patent Number: 4,530,443
[45] Date of Patent: Jul. 23, 1985

[54] UNITARY ACCESS PANEL FOR AIRCRAFT FUEL TANKS

[75] Inventor: Friedrich J. Gorges, Bellevue, Wash.

[73] Assignee: The Boeing Company, Seattle, Wash.

[21] Appl. No.: 567,843

[22] PCT Filed: Nov. 10, 1983

[86] PCT No.: PCT/US83/01761
§ 371 Date: Nov. 10, 1983
§ 102(e) Date: Nov. 10, 1983

[87] PCT Pub. No.: WO85/02159
PCT Pub. Date: May 23, 1985

[51] Int. Cl.³ .............................................. B65D 45/00
[52] U.S. Cl. .................................................... 220/327
[58] Field of Search ................... 220/327, 328, 243; 105/377; 49/DIG. 2; 161/68; 285/38

[56] References Cited

U.S. PATENT DOCUMENTS

| | | | |
|---|---|---|---|
| 2,370,799 | 3/1945 | Kelley | 285/38 |
| 2,562,609 | 7/1951 | Frohnapel | 49/DIG. 2 |
| 2,565,706 | 8/1951 | Thompson | 105/377 |
| 2,572,401 | 10/1951 | Snow | 220/327 |
| 2,597,682 | 5/1952 | Snow | 220/327 |
| 2,607,302 | 8/1952 | Nystrom | 105/377 |
| 2,635,785 | 4/1953 | Gross | 220/328 |
| 2,675,252 | 4/1954 | Haines | 285/38 |
| 2,970,347 | 2/1961 | Massopust | 20/35 |
| 3,329,447 | 7/1967 | Hitz | 220/328 |
| 3,622,430 | 11/1971 | Jurisich | 161/68 |
| 3,625,390 | 12/1971 | Meginnis | 220/328 |
| 4,227,561 | 10/1980 | Molina | 151/41.74 |
| 4,291,816 | 9/1981 | Lamoureux | 220/243 |

Primary Examiner—George T. Hall
Attorney, Agent, or Firm—Delbert J. Barnard; Eugene O. Heberer

[57] ABSTRACT

A unitary structure access panel (10) for use particularly in aircraft wing tanks (32) having openings (30). The panel is made having a molded nylon fiberglass reinforced base (12) and having a high strength-to-weight core (96, 132) spaced between a nylon base first face (24) for extending into the tank and an outer second face (98) for extending outwardly of the tank. In a peripheral portion (20) of the base, there are multiple peripherally spaced recesses (50), each of which contains a lightweight simplified fastener retainer and anti-rotation device (66).

22 Claims, 5 Drawing Figures

U.S. Patent   Jul. 23, 1985   Sheet 3 of 3   4,530,443
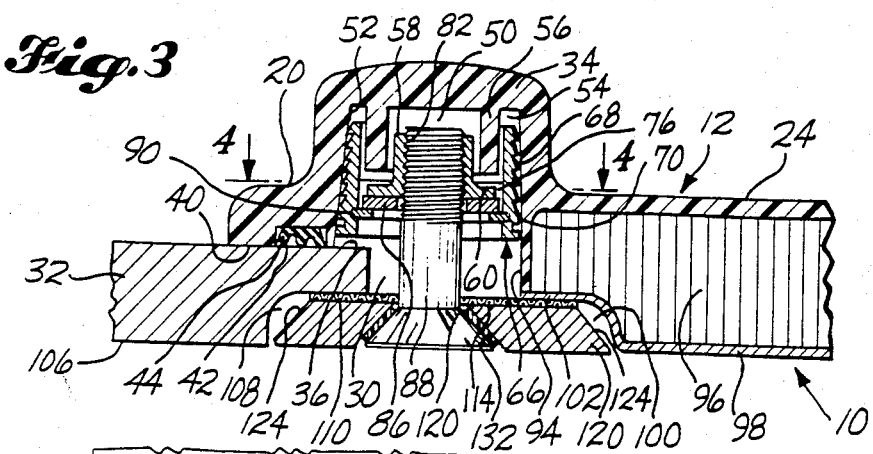
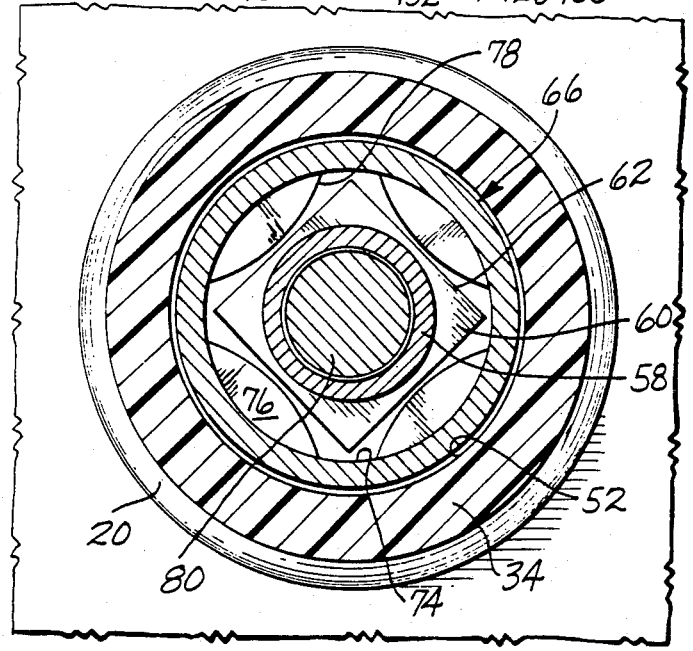
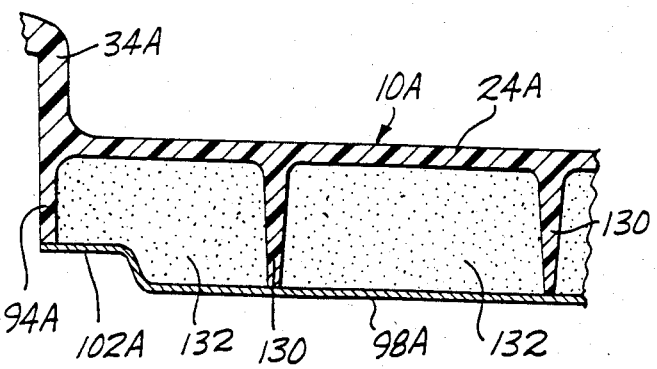

UNITARY ACCESS PANEL FOR AIRCRAFT FUEL TANKS

DESCRIPTION

1. Technical Field

The invention relates to access panels for fuel tanks and particularly, for aircraft wing tanks.

2. Background Art

Prior production access panels, as used for fuel bay access on aircraft wing tanks, are aluminum die cast and extensively machined. In addition to the high weight, there have been numerous in-service complaints concerning corrosion. The present panels have ribs which extend into the tank and form fuel pockets, the fuel therein not being available for use. These panels also require phenolic anti-fretting rings on their outer edges which would otherwise provide a metal-to-metal contact between the edge of the panel and an internal tank surface. Such a contact in a bending wing causes abrasion of the metal parts and ultimately damages the seal which is just inwardly of the panel edge. The present access panels utilize a non-standard sealing ring which is not readily replaceable.

A search of the patent literature has produced patents relating to the problems of access panels. For example, U.S. Pat. No. 2,572,401 illustrates covers for airplane fuel tanks, the covers being attached by a series of bolts arranged around the edges of the tank opening. The nuts are located inside the tank and the bolts are inserted exteriorily thereof. The nuts are positioned in a channel and they are confined laterally by dimples or indentations formed integrally with the walls of the channel. The nuts are confined to a definite longitudinal spacing and are prevented from rotating about the axis thereof. There is an elongated strip under the nuts, welded in place, to retain the nuts. The strip has holes to permit the passage of the bolts, the holes corresponding in spacing to that of the nuts. The holes are large enough to insure that the nuts can be aligned with the bolts. The nuts are sufficiently loosely confined to permit them to conform with the position of the corresponding bolts.

U.S. Pat. No. 2,597,682 discloses an access cover employing a sealing gasket arranged to prevent shearing or rupture the gasket. The cover is secured to a tank skin to provide metal-to-metal contact and to prevent relative movement. The gasket is provided to seal between the cover and the skin in an under cut extending about the edge of the cover. The outer edge of the gasket is continuously exposed to the contents of the tank. Because the cover is tightly clamped against the inside surface of the skin there is assurance that no shear stresses need be sustained by the gasket.

Nuts within the tank to receive the securing screws are in a holding cup for maintaining the nut in screw receiving position and for preventing the nut from rotating. Each cup is secured to the cover by a pair of rivets and the cups are sealed to the cover.

The following patents disclose prior art similar to that described above:
U.S. Pat. No. 2,562,609
U.S. Pat. No. 2,565,706
U.S. Pat. No. 2,607,302
U.S. Pat. No. 2,635,785
U.S. Pat. No. 2,970,347
U.S. Pat. No. 3,622,430.

DISCLOSURE OF THE INVENTION

The invention is a unitary structure access panel for wet bay areas, and particularly for use on and in combination with aircraft wing tanks. A panel base is formed of molded reinforced hard plastic, such as nylon reinforced with fiberglass. The base has an external first face for fitting into the tank and has peripheral side portions extending from the first face. There is an external second face, opposite the first face and joining the peripheral side portions, for facing outwardly along the tank wall. The second face is formed of lightweight electrically conductive material.

A peripheral hard plastic portion of the base extends around the first face for extending into the tank and overlapping an inner marginal tank surface around and alone a tank opening. A high strength-to-weight core is in the base inwardly of the peripheral portion and extends between the faces and the peripheral side portions. There is a continuous groove in the peripheral portion for containing a seal for forming a seal between the peripheral portion and the marginal surface of the tank.

There are peripherally spaced inserts in the peripheral portion and means in the inserts to retain fastener nuts therein and against rotation and adjustably to receive threaded ends of fasteners.

There is a peripheral outer surface of the peripheral portion extending around and along the groove, the outer surface facing in the same direction as the seal for making direct contact with the marginal surface along the seal.

The second face is a thin sheet of aluminum to provide means for electrical conductivity with the tank. The core is aluminum or stiff paper honeycomb. It also may be formed of hard plastic struts extending between the two faces, having the spaces between the struts and faces filled with a rigid plastic foam.

The panel is very lightweight having a non-metallic base, a honeycomb or foam filled core, and a lightweight outer aluminum conductive face or skin. The panel is at least 33% lighter in weight than the prior art die cast panels. For example, a prior art typical panel weighs 3 pounds and a new corresponding panel, according to the invention, weighs 1.85 pounds.

The first face or interior surface of the panel is generally smooth and made without the prior art ribs so as to reduce weight and also eliminate fuel pockets which in the prior art devices contain fuel which can not be used.

The prior art devices, as indicated above, required a phenolic anti-fretting ring because of the metal-to-metal contact in the area just outwardly of the sealing ring. In the present invention, the nylon makes direct contact with the marginal tank surface just outwardly of the seal and there is no abrasion tendency so that an anti-fretting ring is not necessary. Further, in the invention, a standard ring seal may be used; whereas in the prior art the ring seal was not standard and had to be supplied and inserted by a single contractor.

The panel is made by injection molding and is provided with a gate stub for injecting the mold material which can also be used as a drip stick provision.

Another improvement is the provision of a lightweight simplified fastener anti-rotation device.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 3 is a cross sectional assembly view of the structure shown in FIG. 2;

FIG. 4 is an enlarged partially cross-sectional view taken along the lines 4—4 in FIG. 3; and FIG. 5 is a fragmentary cross sectional view of another embodiment of the invention.

BEST MODE FOR CARRYING OUT THE INVENTION

Figure 1:
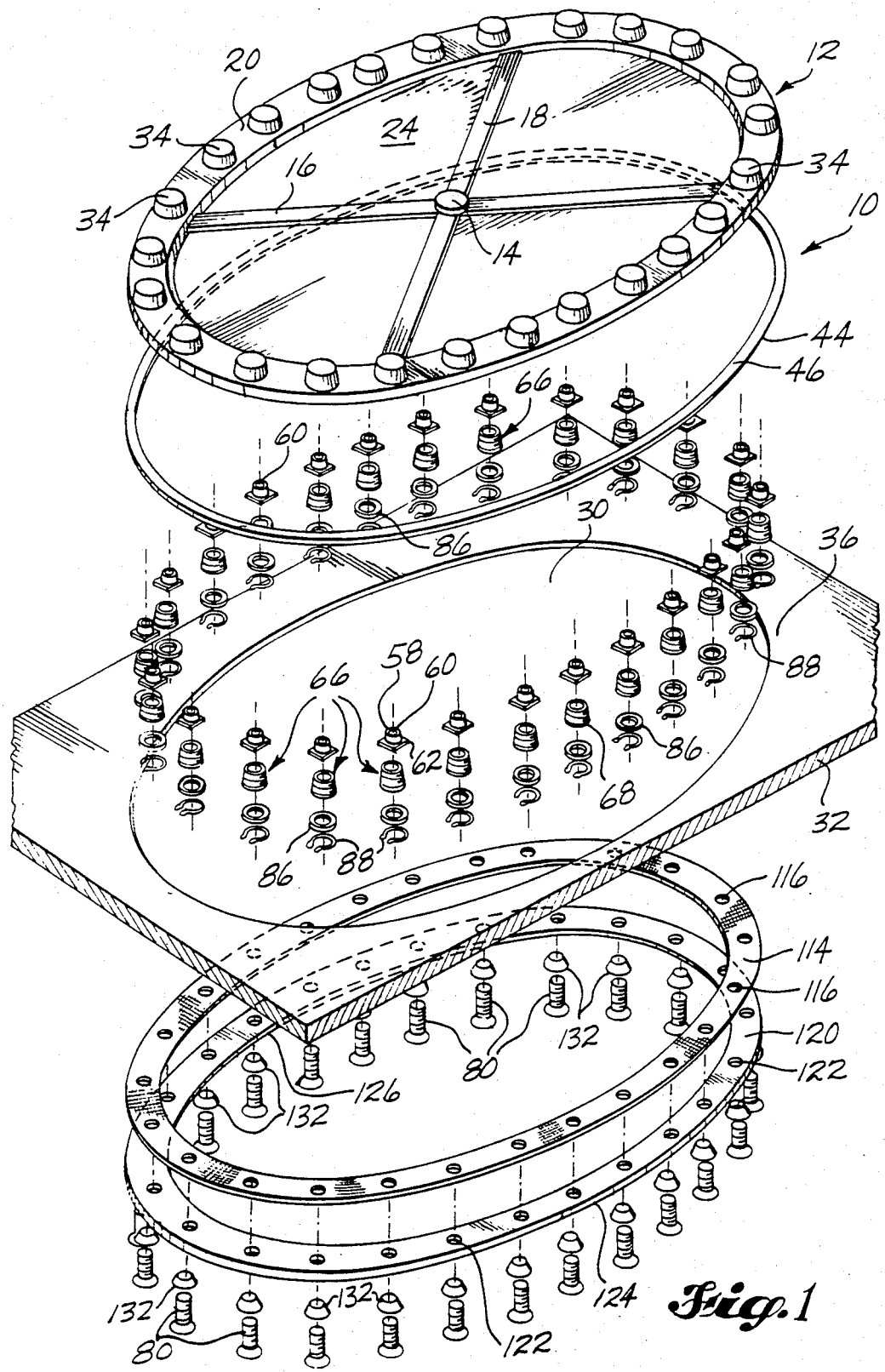
FIG. 1 is an exploded view of an access panel according to the invention, illustrating its relationship to an aircraft wing tank wall.

Referring again to the drawings, there is shown a unitary structure access panel, generally designated as 10, typically used as a closure on aircraft wing tanks and removed to provide access to the interior of the tank for cleaning and repair purposes. The panel is formed of a molded reinforced hard plastic panel base, generally designated as 12, the plastic being, for example, an injection molded nylon reinforced with fiberglass or graphite. The base 12, as shown in FIG. 1, is generally elliptical and has a gate stub 14 through which, when open, the reinforced nylon is injected during the molding process. The gate stub 14 is closed when the molding operation is completed. Extending from the gate stub are crossing runners 16 and 18 which permit the flow of the nylon throughout the mold to fill a peripheral portion 20. The runners are formed in the mold and are exaggerated in FIG. 1 in that they are barely visible in a finished panel which generally has a smooth substantially uninterrupted surface in an upper or first face 24, adapted to be inserted into the tank through an elliptical opening 30 in a tank wall 32.

The peripheral portion 20 of the panel is slightly raised above the face 24 and has upwardly extending therefrom a series of peripherally-spaced dome-shaped protrusions 34.

The peripheral hard plastic portion 20 on the base extends around the first face 24 and into the tank overlapping an inner marginal tank surface 36 around and along the tank opening 30.

Figure 2:
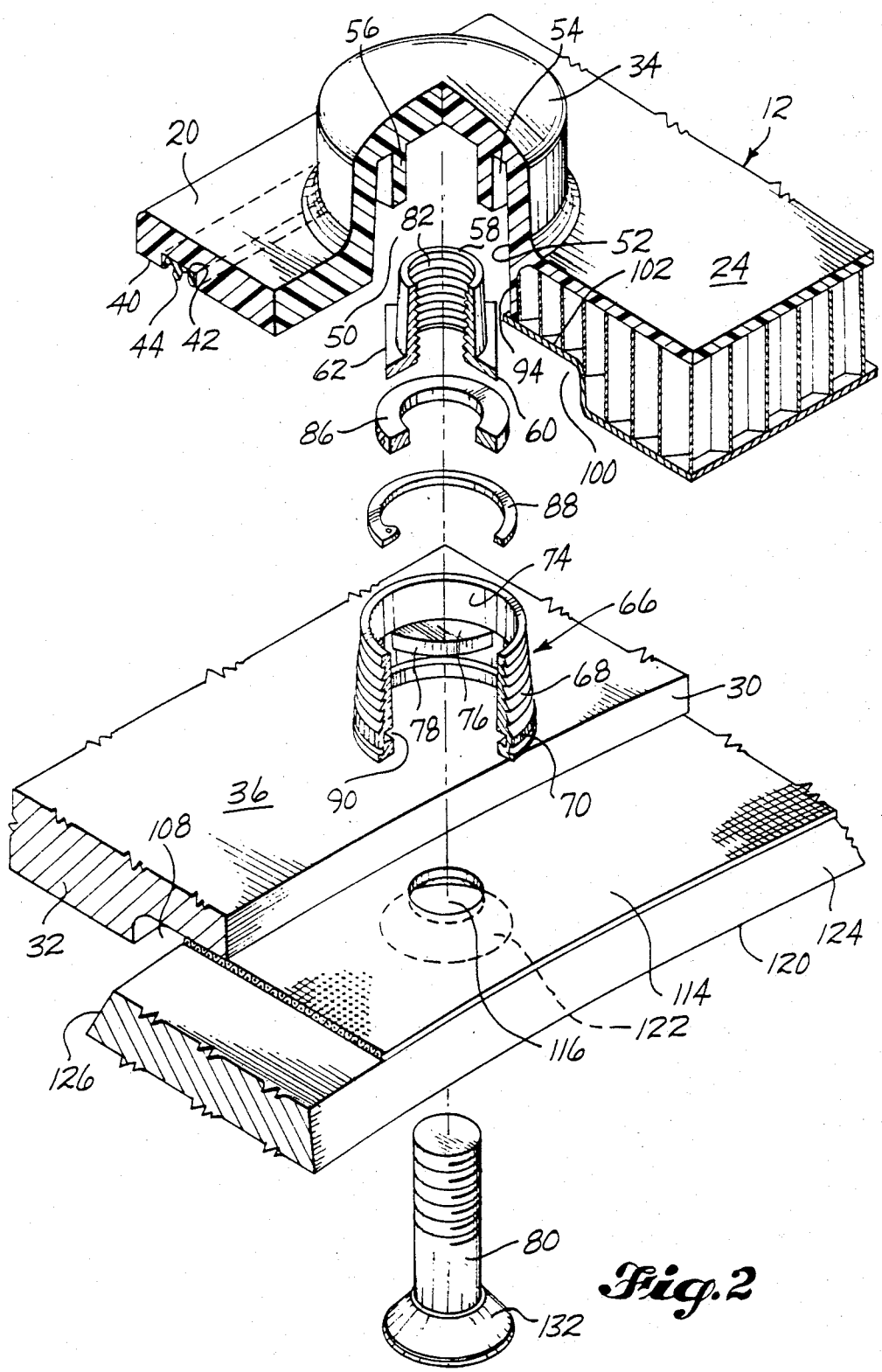
FIG. 2 is an exploded view of a fragmentary portion of a panel, illustrating the panel structure in detail and a lightweight simplified fastener anti-rotation device, according to the invention.

A peripheral outer edge surface 40, FIGS. 2 and 3, along the base abuts the aluminum marginal edge 36 around the tank opening. A continuous, generally channel-shaped groove 42 extends around the periphery of the base just inwardly of the surface 40 to receive a standard replaceable silicone rubber seal 44. The seal is formed in linear footage and is cut so as to mate at complementary 45 degree angles where it is bonded at 46, FIG. 1. The upper surface of the seal is flat and the lower surface has linear grooves which are flattened against the tank surface 46 when sealingly engaged therewith.

The domes 34 have generally conical recesses 50, FIGS. 2 and 3, therein which open toward the exterior of the tank when the domes are positioned inside the tank. Each recess 50 has a slightly conical wall 52, the diameter diminishing inwardly into the recess. Radially inwardly of the wall 52 is an annulus 54 formed by a cylindrical wall 56. The wall 56 provides a strengthening member, and a guide and a positioner for cylindrical portion 58 of a fastener nut 60 having a rectangular base 62.

A conical sleeve-shaped insert 66 is ultrasonically press fit against the recess wall 52. The insert has an external conical wall surface formed of serrations 68 to hold the insert in the nylon wall 52. Adjacent the lower or outer end of the insert, there are axially directed alternate lands and grooves, the lands 70 being embedded in the nylon wall 52 to prevent rotation of the insert. The insert has a generally cylindrical internal wall 74 from which extend four radially directed protrusions 76, FIGS. 2–4, the protrusions having inwardly facing convex surfaces 78 along which the rectangular side 62 walls of the nuts extend, the protrusions preventing the nuts from rotating. The nuts are fitted loosely within the protrusion so that they may adjustably receive Philipshead fasteners 80 to engage the threads 82 of the nuts.

After the nut is inserted into the insert, as indicated in FIG. 3, which may be during the manufacture of the panel, a washer 86 is placed under the nut. The washer and nut are then secured in place by means of a snap ring 88 secured in an annular groove 90 in the internal wall of the insert. Thus, the nuts 60 are properly positioned in each of the inserts and recesses and retained therein and held against rotation in a loose adjustable manner so that the fasteners 80 can be easily threadedly engaged with the nuts.

Laterally inwardly of the peripheral portion 20, wall 52 extends downwardly and outwardly relative to the tank to form a peripheral side portion 94, FIGS. 2 and 3, which joins the first face 24 to form peripheral enclosure of a core section 96 which extends between the first face 24 and a second face 98. The core section 96 is in the form of aluminum honeycomb and the second face 98 is formed of a thin aluminum skin for extending generally along the outer surface of the tank. The second face 98 is relieved at 100 to lessen the depth of the core in a aluminum peripheral extension 102 of the skin 98, joining the peripheral side portion 94. Peripheral side portions between the domes 34 are not shown but they are substantially in alignment with portions 94 and are continuous therewith.

Outwardly of the opening 30, an outer tank wall surface 106 is relieved at 108, forming a peripheral outer surface 110 in alignment with the surface 102 of the panel when the panel is inserted into the tank, as shown in FIG. 3. A continuous woven wire conductive gasket 114, FIGS. 1–3, has peripherally spaced holes 116. The gasket 114 is supported in place by a clamp ring 120 having countersunk holes 122, the holes 122, 116 and the threads 82 being in register.

The continuous ring clamp 120 has beveled edges 124 and 126 to fit within the relieved areas 100 and 108, respectively. The fasteners 80 have a countersunk head 130 and a teflon gasket 132 is fitted thereon to form an environmental seal to prevent entry of moisture or foreign materials into the tank around the fasteners.

Thus, when the panel 10 is inserted into the tank opening 30, the panel is positioned as shown in FIG. 3, the inserts and nuts, having already been secured in the recesses during the final steps of the panel assembly. Similarly, the ring seal 44 is inserted within the continuous groove 42. The woven wire gasket is positioned with its upper face on the aluminum surface 102 and on the aluminum tank surface 110 to provide a conductive path through the tank and panel, and then the clamp ring 120 is positioned with the holes in register to receive the fasteners 80 which are threadedly engaged into the nuts 62 to tighten the panel in the tank and to tighten the seal 44 on the marginal surface 36 of the tank. The outer peripheral surface 40 is also tightened on the tank surface 36 and there is no abrasive problem between the nylon in the panel and the metal in the tank so that anti-fretting material is not required at the surface 40. Similarly, the gasket 94 lubricated with grease so as to eliminate any abrasion between the metal surfaces and the grease in the woven wire does not interfere with the electrical conductivity required between the tank and the panel in the event of the development of electrical charges from lightning or other possible sources.

In FIG. 5, another embodiment of the invention is illustrated. Here, a core in a panel 10A, generally the same as the panel 10 except for the core, has plastic struts 130 extending between the first face 24A and the second face 98A and the space between the faces and struts are filled with a rigid plastic foam 132. This provides a lightweight core in place of the honeycomb 96.

The invention and its attendant advantages will be understood from the foregoing description and it will be apparent that various changes may be made in the form, construction, and the arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. A unitary structure access panel for a fuel tank, comprising:
    a molded reinforced hard plastic panel base for fitting into an opening in a tank;
    said panel base having an external first face for fitting into the tank and having peripheral side portions extending from the first face;
    an external second face, opposite said first face and joining said peripheral side portions, for facing outwardly along the tank wall,
    said second face being formed of lightweight electrically conductive material;
    a peripheral hard plastic portion on said base extending around said first face for extending into the tank and overlapping an inner marginal tank surface around and along the tank opening;
    a high strength-to-weight core in said base inwardly of said peripheral portion and extending between said faces and said peripheral side portions;
    a continuous groove in said peripheral portion for containing a seal for forming a seal between the peripheral portion and the marginal surface of the tank;
    peripherally spaced inserts in said peripheral portion;
    means in said inserts to retain fastener nuts therein and against rotation and adjustably to receive threaded ends of fasteners; and
    a peripherally outer surface of said peripheral portion extending around and along said groove, said outer surface facing in the same direction as the seal for making direct contact with said marginal surface along said seal.

2. The invention according to claim 1 in which: said hard plastic is nylon reinforced with fiberglass.

3. The invention according to claim 2 in which:
said second face is a thin sheet of aluminum.
4. The invention according to claim 3 in which:
said core is aluminum honeycomb.
5. The invention according to claim 3 in which:
said core is formed of spaced hard plastic struts extending between the two faces,
the spaces between the struts and faces being filled with rigid plastic foam.
6. The invention according to claim 1 in which:
said inserts are secured within recesses in said peripheral portion;
said recesses being formed within dome-shaped members for extending into the tank beyond said first face and the marginal surface of the tank.
7. The invention according to claim 6 in which:
said recesses have conical inner surfaces having diameters diminishing inwardly into said dome-shaped members;
said inserts being sleeve-shaped having walls generally conical externally, corresponding with said recesses and being force fit therein;
said inserts having external conical annular serrations engaging surfaces of said recesses so as to be retained therein and having axially directed lands and grooves with lands engaging recess surfaces to prevent rotation of the inserts.
8. The invention according to claim 7 in which:
said means within said inserts to retain said nuts against rotation are protrusions extending radially inwardly from the interior of the sleeve walls and having radially inwardly facing axially directed convex surfaces;
said convex surfaces being positioned to loosely engage side walls of the nuts and to prevent their rotation.
9. The invention according to claim 8 in which:
said means to retain said nuts in the inserts include a washer positioned between said protrusions and a snap ring in a groove in the insert wall, the snap ring being axially outwardly of the nut, the protrusions, and the washer;
the washer having an internal diameter smaller than the nut and larger than the fastener.
10. The invention according to claim 1 in which:
said first and second faces are generally smooth, having substantially uninterrupted continuous surfaces.
11. In a fuel tank in an aircraft, a unitary structure access panel fitted into and sealing an opening in the tank and for providing access to the tank when removed, comprising:
    a molded reinforced hard plastic panel base;
    said panel base having an external first face within a tank opening and generally aligned with an inner surface of a tank wall around the opening;
    said panel base having peripheral side portions extending from the first face generally within the tank opening;
    an external second face, opposite said first face and joining said peripheral side portions, and facing outwardly of the tank, generally aligned with an external wall surface of the tank;
    said second face being formed of lightweight electrically conductive material;
    a peripheral hard plastic portion on said base extending around said first face and extending into the tank and overlapping an inner marginal tank surface around and along the tank opening;

a high strength-to-weight core in said base inwardly of said peripheral portion and extending between said faces and said peripheral side portions;

a continuous groove in said peripheral portion for containing a seal forming a seal between the peripheral portion and the marginal surface of the tank;

peripherally spaced inserts in said peripheral portion;

means in said inserts to retain fastener nuts therein and against rotation and adjustably to receive threaded ends of fasteners;

a peripherally outer surface of said peripheral portion extending around and along said groove, said outer surface facing in the same direction as the seal and making direct contact with said marginal surface along said seal;

an outer marginal tank surface opposite said inner marginal tank surface, said outer surface having a relieved portion outwardly of said tank opening and having therein an outer peripheral portion of a clamp ring;

a peripheral portion of said second face extending inwardly toward said first face, forming a relieved peripheral portion around the second face inwardly and opposite the relieved outer marginal portion of the tank, said relieved portion around the second face having an inner peripheral portion of said clamp ring therein;

a nonabrading electrically conductive gasket on said clamp ring and in contact with said tank and second face;

said clamp ring and gasket having fastener openings in register with respective nuts in said recesses; and fasteners extending through said ring and gasket openings and tightly engaged with respective nuts to secure said panel in said tank, and tighten said seal and peripheral outer surface on said inner marginal tank surface.

12. The invention according to claim 11 in which:
said first and second faces are generally smooth, having substantially uninterrupted continuous surfaces.

13. The invention according to claim 11 in which:
said hard plastic is nylon reinforced with fiberglass.

14. The invention according to claim 11 in which:
said core is aluminum honeycomb.

15. The invention according to claim 11 in which:
said core is formed of spaced hard struts extending between the two faces;
the spaces between the struts and faces being filled with rigid plastic foam.

16. The invention according to claim 11 in which:
said inserts are secured within recesses in said peripheral portion;
said recesses being formed within dome-shaped members and extending into the tank beyond said first face and the inner marginal surface of the tank.

17. The invention according to claim 16 in which:
said recesses have conical inner surfaces having diameters diminishing inwardly into said dome-shaped members;
said inserts being sleeve-shaped having generally conical external walls, corresponding to said recesses and being force fit therein;
said inserts having external conical annular serrations engaging surfaces of said recesses so as to be retained therein; and having axially directed lands and grooves with lands engaging recess surfaces to prevent rotation of the inserts.

18. The invention according to claim 17 in which:
said means within said inserts to retain said nuts against rotation are protrusions extending radially inwardly from the interior of the sleeve walls and having radially inwardly facing axially directed convex surfaces;
said convex surfaces being positioned to loosely engage side walls of the nuts and to prevent their rotation.

19. The invention according to claim 18 in which:
said means to retain said nuts in the inserts include a washer positioned between said protrusions and a snap ring in a groove in the insert wall, the snap ring being axially outwardly of the nut, the protrusion, and the washer;
the washer having an internal diameter smaller than the nut and larger than the fastener.

20. The invention according to claim 19 in which:
said recesses have an inner base surface from which extend axially outwardly, a cylindrical wall spaced radially inwardly of the conical inner surface,
the insert wall extending between the cylindrical wall and the conical inner surface of the recess,
the cylindrical wall terminating axially outwardly of the protrusions and provide a guide to receive a cylindrical inner end of the nut and provide a strengthening member in the recess.

21. The invention according to claim 9 in which:
said recesses have an inner base surface from which extend axially outwardly, a cylindrical wall spaced radially inwardly of the conical inner surface,
the insert wall extending between the cylindrical wall and the conical inner surface of the recess,
the cylindrical wall terminating axially outwardly of the protrusions and provide a guide to receive a cylindrical inner end of the nut and provide a strengthening member in the recess.

22. A unitary structure access panel for a fuel tank, comprising:
a molded reinforced hard plastic panel base for fitting into and sealing an opening in a tank,
said panel base having an external substantially smooth and uninterrupted first face for fitting into the tank, and having peripheral side portions extending from the first face;
an external second face, opposite said first face and joining said peripheral side portions for facing outwardly along the tank wall;
said second face being formed of lightweight electrically conductive material, and being relieved peripherally to receive a clamp ring and gasket in an electrically conductive relationship;
a peripheral hard plastic portion on said base extending around said first face for extending into the tank and overlapping an inner marginal tank surface around and along the tank opening;
a high strength-to-weight core in said base laterally inwardly of said peripheral portion and extending between said faces and said peripheral side portions;
a continuous groove in said peripheral portion for containing a seal for forming a seal between the peripheral portion and the marginal surface of the tank;
peripherally spaced inserts in said peripheral portion;

means in said inserts to retain fastener nuts therein and against rotation and adjustably to receive threaded ends of fasteners;

means in said inserts inwardly of said last means to provide a guide to receive cylindrical inner ends of the nuts and provide strengthening members in the recesses; and a peripherally outer surface of said peripheral portion extending around and along said groove, said outer surface facing in the same direction as the seal for making direct contact with said marginal surface along said seal.

* * * * *